Apr. 10, 1923.
W. S. ROBINETT
TIRE CHANGER
Filed Feb. 23, 1922
1,451,344
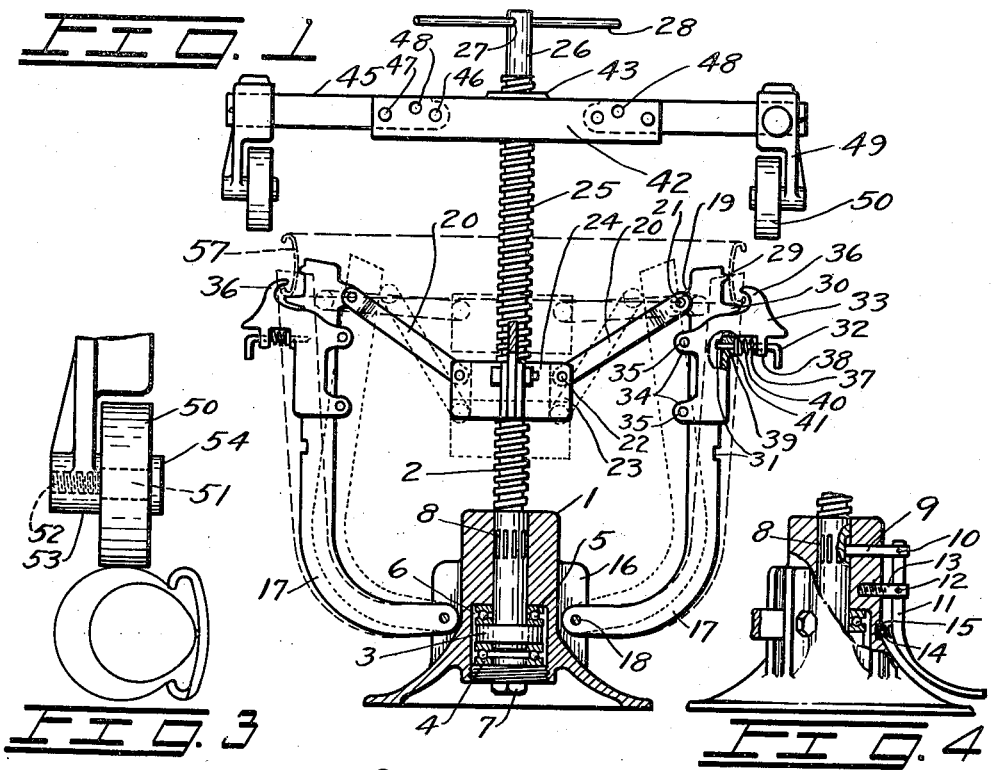
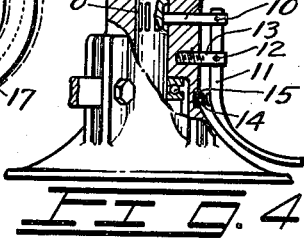
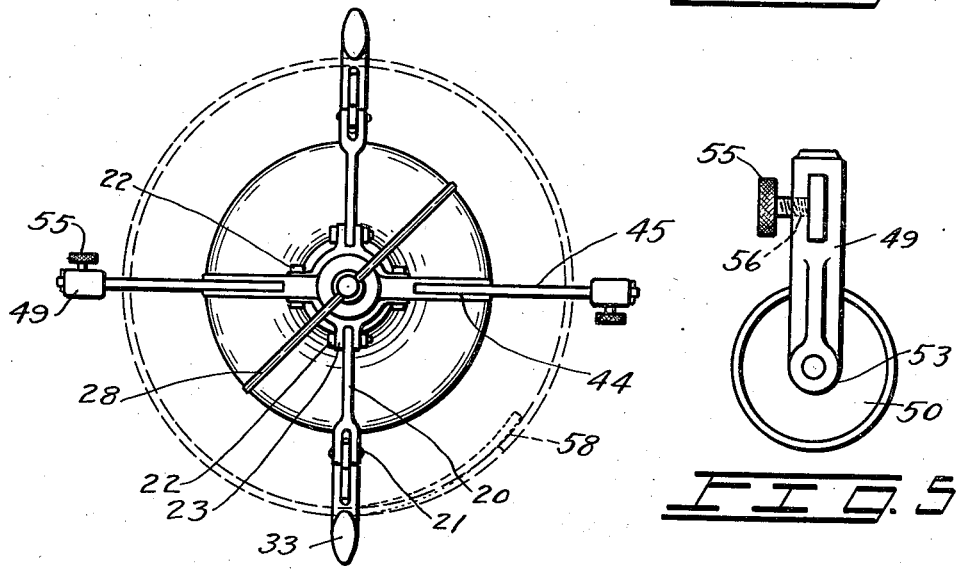
INVENTOR
Winfield S. Robinett
BY
Harry Bowen
ATTORNEY Patented Apr. 10, 1923.

1,451,344

UNITED STATES PATENT OFFICE.

WINFIELD S. ROBINETT, OF SEATTLE, WASHINGTON.

TIRE CHANGER.

Application filed February 23, 1922. Serial No. 538,539.

*To all whom it may concern:*

Be it known that I, WINFIELD S. ROBINETT, a citizen of the United States, residing at Seattle, county of King, and State of Washington, have invented a new and useful Tire Changer; and I do hereby declare that the following is a full, clear, and exact specification, such as will enable others skilled in the art to which it appertains to make and use the same.

The invention is a device for either removing or replacing tires on solid or split rims of automobile wheels.

The object of the invention is to provide a device which will grip a split rim of an automobile wheel and draw it together so that the tire may be easily removed or force it outward to bring the ends together when the tire has been replaced.

Another object of the invention is to provide a device over which wire wheels may be placed which will grip and hold them while the tire is being removed or replaced.

Another object of the invention is to provide a device over which disc or solid wheels may be placed that will grip and hold them while the tires are being removed or replaced.

And a still further object of the invention is to provide a device which will grip split or solid rims, wire wheels, and solid wheels which has rollers mounted on a screw thread so that they may be turned against the tires on the wheels in such a manner that as they are rotated they will force the tires off of the wheels.

Other features and advantages of the invention will appear from the following description taken in connection with the drawings, wherein:—

Figure 1 is a side elevation with part broken away.

Figure 2 is a top plan view.

Figure 3 is a detail showing the roller bearing down on top of the tire as it would appear in the act of removing the tire.

Figure 4 is a sectional view of the base broken away on the center line of the spindle holding latch.

Figure 5 is an end view of the horizontal bar and roller bracket.

In the drawings I have shown my device as it would be constructed wherein numeral 1 indicates the base which has a spindle 2 rotatably supported in it. The spindle 2 has a collar 3 on its lower end which rests on top of a thrust bearing 4 and which has another thrust bearing 5 on top of it. These bearings and the collar are placed in a recess 6 in the lower part of the base and held in place by a nut 7. It will be seen that these bearings will take either an upward or downward thrust and it is understood that any desired type of bearings or thrust collars may be used. In the spindle near the upper part of the base are notches 8 into which a pin 9 projects to prevent the spindle from rotating. The pin 9 is connected thru another pin 10 to a lever 11 which is shaped as shown in Figure 4 and which is pivotally connected thru a pin 12 to a post 13 on the side of the base. A spring 14 may set in a recess 15 in the base and bear against the under side of the lever 11 to hold it outward in the position shown. It will be seen that as pressure is placed on the lower end of the lever 11 the upper end will move outward and draw the pin 9 out of the slots 8 which will permit the spindle to rotate.

On the sides of the base are lugs 16 to which the arms 17 are pivoted by the bolts 18. In my construction I have shown four of the arms 17 but it is understood that three, six or any desired number may be used. On the inner side of the upper ends of the arms are lugs 19 to which the links 20 are pivotally connected by the pins 21. The opposite end of these links 20 are connected by pins 22 to the flanges 23 of a collar 24. In the center of this collar is a threaded hole, the threads of which match the threads 25 on the spindle 2. The upper end 26 of the spindle 2 may be smooth as shown in Figure 1 and may have a hole 27 thru it in which a bar 28 may be placed to rotate the spindle.

On the outer edges of the arms 17 and near their tops are small lugs 29 which bear against the inner surface of rims or wheels and below these lugs 29 are larger lugs 30 upon which the rims or wheels may rest. In the outside of the arms 17 are also notches 31 into which the pin 32 projects which holds the jaw 33 up in the desired position. The jaw 33 may be constructed as shown in Figure 1 with lugs 34 on its inner side in which are pins 35 which bear against the inner side of the arms 17. The jaw 33 projects outward and has a hooked shaped lug 36 on its upper side which when in the position shown in Figure 1 will grip a rim and draw it together. On the lower side of the jaw 33 is a projection 37 in which is a hole 38 thru which the pin 32 passes and in the jaw is another hole 39 which holds the inner end of the pin. A spring 40 is placed around the pin and a collar 41 fixedly mounted upon it. The spring 40 bearing against the collar 41 and the inside of the projection 37 will hold the pin inward in the notch until it is pulled outward by pulling on the outer end which may be bent at right angles to form a handle.

A horizontal member 42 with a hub 43 in it in which is a threaded hole having threads to match the threads 25 on the spindle 2, may be placed over the top of the spindle. In the outer ends of the member 42 are slots 44 in which are bars 45. These bars are pivotally supported on pins 46 and are held in the position shown by placing pins 47 thru holes in the sides of the member 42 and thru a hole which matches these holes in the bar 45. When it is desired to remove the rim or to use the machine without removing the member 42 the bars 45 may be raised to a vertical position by removing the pins 47 and they may be held in a vertical position by placing the pins 47 in the holes 48. On the outer ends of the bars are slidably mounted brackets 49 with wheels 50 rotatably mounted on bolts 51 which are screwed into holes 52 in the hubs 53 at the lower ends of the brackets 44. These bolts 51 may have heads 54 on them to hold the wheels 50 on the bolts. Screws 55 may be placed in threaded holes 56 in the sides of the brackets 49 by which the brackets may be held in any desired position along the bars.

It will be understood that changes in the construction can be made without departing from the spirit of the invention. One of which changes may be in the use of one or more than two of the rollers 50 instead of the two as shown. Another may be in the making of the projection 36 a part of the arm 17 instead of slidably attaching it to it as shown. And another may be in the use of different means for preventing the spindle 2 from rotating instead of the use of the lever 15 and the pin 9 as shown. And still another change may be in the use of a different means for moving the arms 17 inward and outward.

The construction will be readily understood from the foregoing description. To use the device for removing a tire from a split rim it may be set as shown with the member 42 removed or with the bars 45 held in vertical positions as hereinbefore described and the rim placed over the top of the machine until it rests in the position indicated by the dash lines 57 in Figure 1, the spindle 2 may then be turned until the collar 24 moves downward toward the position shown in dotted lines during which motion the projections 36 will pull the rim together until one end laps over the other as shown at the point 58 in Figure 2. As the rim is drawn together it will become smaller so that the tire may be readily removed and another one placed on the rim. The spindle 2 may then be turned in the opposite direction which will raise the collar 24 toward the position indicated by dash lines in Figure 1 which will force the rim outward until the two ends abut.

When it is desired to remove a tire from a wire, disc, or solid wheel the member 42 is first removed by taking the bar 28 out and turning the member 42 in such a direction that it will move off of the top of the threads 25 so that it may be lifted off of the device. The wheel is then placed over the device and the spindle 1 passes thru the hole in the center of the wheel. The wheel is then placed upon the lugs 30 and the member 42 and the bar 28 replaced, the spindle is then turned until the lugs 29 positively grip the inner surface of the rim of the wheel and the jaws 33 are lowered. The member 42 is then rotated so that it will move downward on the threads 25 and as it comes downward the rollers 50 which have been set so that their inner sides will clear the outer edge of the rim, will bear against the upper sides of the tire as shown in Figure 3 and as the motion is continued the rollers will force the tire off of the lower side of the rim of the wheel as the bead on that side would be removed before the wheel is placed in the machine. It will be seen that as the member 42 is moved down a slow screw thread a tremendous pressure may be brought to bear upon the tire so that no matter how hard it has stuck to the rim it will be possible to force it off.

Having thus fully described the invention, what I claim as new and desire to secure by Letters Patent is:—

1. A tire changer of the class described embodying a vertical spindle supported in thrust bearings in a suitable base which will permit it to rotate; threads on the spindle; notches around the spindle; a pin slidably mounted in a hole in the base which engages the notches in the spindle; a lever pivotally supported on the side of the base to operate the pin; a spring in a recess in the base bearing against the lever to hold the pin in the notches; lugs on the sides of the base; arms pivotally mounted to the lugs which project outward and upward; lugs on the inner side of the upper end of the arms; links pivotally mounted on the lugs whose opposite ends are pivotally mounted in a collar which is screwed on the spindle; lugs on the outer edges of the arms; notches in the outer edges of the arms; jaws slidably mounted on the arms; spring latches in the jaws to engage the notches in the arms; hook shaped projections on the upper sides of the jaws; a horizontal member also screwed on the spindle; bars pivotally mounted in the horizontal member; pins for holding the bars in a horizontal position; other pins and holes for holding the bars in vertical positions; brackets with set screws slidably mounted on the bars; rollers pivotally mounted in the lower ends of the brackets; and a hole in the top of the spindle thru which a bar may be placed for rotating it.

2. A tire changer of the class described embodying a vertical spindle rotatably mounted in a base; threads on the spindle; arms pivotally mounted on the sides of the base; a latch on the side of the base for preventing the spindle from rotating when desired; links pivotally connected to the upper end of the arms and to a collar on the spindle; lugs on the outer sides of the arms; a horizontal member with a threaded hole in it screwed on the spindle; bars pivotally mounted in the ends of the horizontal member; wheels adjustably supported on the ends of the bars; and a means at the top of the spindle for rotating it.

3. A tire changer of the class described comprising a vertical spindle rotatably mounted in a base; suitable means in the base for taking the thrust from the spindle in both directions; means in the base for holding the spindle in any position; arms pivotally mounted on the sides of the base projecting upward; suitable means at the upper end of the arms for connecting them to the spindle so that as the spindle is turned in one direction the arms will be pulled inward and as it is turned in the opposite direction the arms will be pushed outward; and suitable lugs at the upper ends of the arms for supporting the rims of wheels and for either pushing them outward or drawing them inward.

4. A tire changer of the type described embodying a vertical spindle which is rotatably mounted in a base; arms which project upward pivotally mounted around the spindle; means for connecting the upper ends of the arms to the spindle in such a manner that as the spindle is rotated in one direction the arms will move inward and as it is rotated in the opposite direction the arms will move outward; lugs on the outer sides of the arms; notches in the outer sides of the arms; jaws slidably mounted on the arms; latches in the jaws which engage the notches in the arms; hook shaped projections on the upper sides of the jaws; rollers adjustably mounted on the ends of the horizontal bar which is mounted on threads on the spindle so that as it is rotated it will move upward or downward; and suitable means for rotating the spindle.

5. A tire changer of the type described comprising a vertical spindle rotatably mounted in a base; suitable thrust collars in the base for taking the thrust upward and downward; means for holding the spindle in any position; arms pivotally mounted around the spindle; links pivotally connected to the upper ends of the arms whose opposite ends are pivotally connected to a collar having a threaded hole in its center which screws on threads on the spindle; lugs on the outer ends of the arms; hook shaped projections adjustably supported on the arms; and rollers adjustably supported on horizontal members which are screwed on the spindle.

6. A tire changer of the character described comprising a vertical spindle rotatably mounted in a base; means in the base for holding the spindle in different positions; arms pivotally mounted on the sides of the base projecting upward; suitable means at the upper ends of the arms for connecting them to the spindle so that they will move inward or outward as the spindle is rotated backward or forward; suitable lugs at the upper ends of the arm for supporting rims of wheels and for either pushing them outward or drawing them inward; and rollers adjustably supported on the ends of a bar that is screwed on the spindle.

WINFIELD S. ROBINETT.